(12) United States Patent
Matsoukas et al.

(10) Patent No.: US 9,653,093 B1
(45) Date of Patent: May 16, 2017

(54) GENERATIVE MODELING OF SPEECH USING NEURAL NETWORKS

(71) Applicant: Amazon Technologies, Inc., Reno, NV (US)

(72) Inventors: Spyridon Matsoukas, Hopkinton, MA (US); Nikko Ström, Kirkland, WA (US); Ariya Rastrow, Seattle, WA (US); Sri Venkata Surya Siva Rama Krishna Garimella, Viskhapatnam (IN)

(73) Assignee: Amazon Technologies, Inc., Seattle, WA (US)

( * ) Notice: Subject to any disclaimer, the term of this patent is extended or adjusted under 35 U.S.C. 154(b) by 130 days.

(21) Appl. No.: 14/463,411

(22) Filed: Aug. 19, 2014

(51) Int. Cl.
*G10L 15/16* (2006.01)
*G10L 25/30* (2013.01)
*G10L 15/07* (2013.01)
*G10L 15/08* (2006.01)
*G10L 15/14* (2006.01)

(52) U.S. Cl.
CPC .............. *G10L 25/30* (2013.01); *G10L 15/07* (2013.01); *G10L 15/16* (2013.01); *G10L 15/08* (2013.01); *G10L 15/142* (2013.01); *G10L 15/144* (2013.01)

(58) Field of Classification Search
CPC ......... G10L 15/07; G10L 25/30; G10L 15/16; G10L 15/02; G10L 15/08; G10L 15/22; G10L 15/30; G10L 15/815; G10L 15/197; G10L 15/142; G10L 15/144; G10L 15/063; G10L 15/14; G10L 15/20; G10L 15/10; G10L 13/06
USPC ................ 704/231, 232, 236, 240, 255, 256
See application file for complete search history.

(56) References Cited

U.S. PATENT DOCUMENTS

| | | | | |
|---|---|---|---|---|
| 5,832,430 A | * | 11/1998 | Lleida | G10L 15/142 704/231 |
| 6,003,003 A | * | 12/1999 | Asghar | G10L 15/02 704/243 |
| 6,009,391 A | * | 12/1999 | Asghar | G10L 15/02 704/222 |
| 7,254,538 B1 | * | 8/2007 | Hermansky | G10L 15/144 704/232 |
| 8,442,821 B1 | * | 5/2013 | Vanhoucke | G10L 15/14 704/232 |
| 2007/0198257 A1 | * | 8/2007 | Zhang | G10L 17/20 704/233 |
| 2008/0208577 A1 | * | 8/2008 | Jeong | G10L 15/32 704/231 |
| 2011/0131043 A1 | * | 6/2011 | Adachi | G10L 15/08 704/246 |

(Continued)

*Primary Examiner* — Vu B Hang
(74) *Attorney, Agent, or Firm* — Knobbe, Martens, Olson & Bear, LLP

(57) ABSTRACT

Features are disclosed for using an artificial neural network to generate customized speech recognition models during the speech recognition process. By dynamically generating the speech recognition models during the speech recognition process, the models can be customized based on the specific context of individual frames within the audio data currently being processed. In this way, dependencies between frames in the current sequence can form the basis of the models used to score individual frames of the current sequence. Thus, each frame of the current sequence (or some subset thereof) may be scored using one or more models customized for the particular frame in context.

22 Claims, 5 Drawing Sheets

(56) References Cited

U.S. PATENT DOCUMENTS

2012/0065976 A1* 3/2012 Deng ................ G10L 15/14
  704/256.1
2015/0127337 A1* 5/2015 Heigold ............ G10L 15/063
  704/232

* cited by examiner

GENERATIVE MODELING OF SPEECH USING NEURAL NETWORKS

BACKGROUND

Computing devices can be used to process a user's spoken commands, requests, and other utterances into written transcriptions. Models representing data relationships and patterns, such as functions, algorithms, systems, and the like, may accept audio data input (sometimes referred to as an input vector), and produce output (sometimes referred to as an output vector) that corresponds to the input in some way. In some implementations, a model is used to generate a probability or set of probabilities that the input corresponds to a particular language unit (e.g., phoneme, phoneme portion, triphone, word, n-gram, part of speech, etc.). For example, an automatic speech recognition ("ASR") system may utilize various models to recognize speech, such as an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance.

ASR systems commonly utilize Gaussian mixture models/hidden Markov models ("GMMs/HMMs") to tag language units in sequences of natural language input. However, artificial neural networks may also be used. Scores in neural-network-based ASR systems are obtained by multiplying trained weight matrices, representing the parameters of the model, with vectors corresponding to feature vectors or intermediate representations within the neural network. This process is referred to as a forward pass. The output can be used to determine which language unit most likely corresponds to the input feature vector. Due to the sequential nature of spoken language, the correct output for a feature vector for a particular frame of audio data may depend upon the output generated for a feature vector for the sequentially previous frame of audio data. Some systems incorporate sequential aspects of language by defining input feature vectors as a function of a contiguous span of observations (e.g., based on the feature vectors for the current frame and the previous n frames of audio data).

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
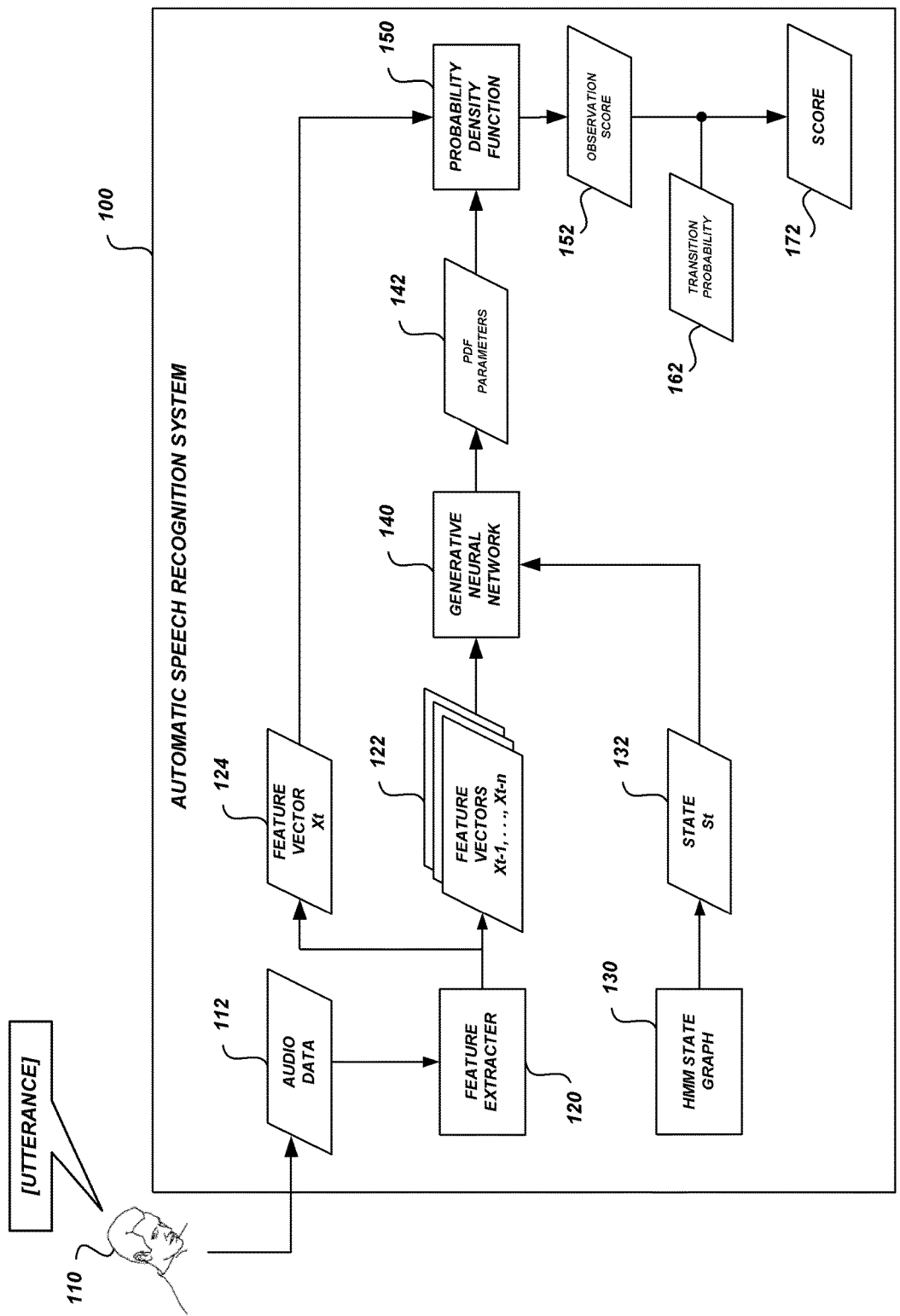
FIG. 1 is a block diagram of an illustrative speech recognition system using neural network-based generative modeling of speech according to some embodiments.

The present disclosure is directed to dynamically generating customized speech recognition models during the speech recognition process. By dynamically generating the speech recognition models during the speech recognition process, the models can be customized based on the specific context of individual frames within the audio data currently being processed. In this way, dependencies between frames in the current sequence can form the basis of the models used to score individual frames of the current sequence. Thus, each frame of the current sequence (or some subset thereof) may be scored using one or more models customized for that particular frame in context.

Generally described, automatic speech recognition ("ASR") systems find the word sequence W that most likely corresponds to an utterance in audio data described by a given sequence of feature vectors X (e.g., find W that has the highest posterior probability, given X, by maximizing $P(W|X)$). The sequence of feature vectors $X=(x_1, \ldots, x_T)$ is extracted from audio data. In a common implementation, the audio data is separated into a series of frames, such as one frame for each 10 milliseconds of audio, and features are extracted for each frame. A feature vector is generated for each frame of audio (or some subset thereof) based on the extracted features for the frame. In this way, audio data is processed into a sequence of feature vectors that describe the audio data in a way that can be scored using the probabilistic acoustic models and language models of the ASR system.

Conventional ASR systems seek to maximize $P(W|X)=P(X|W)P(W)$. In this equation, $P(W)$ is the posterior probability of the word sequence W, as provided by the language model (e.g., the probability of the word sequence W occurring generally, based on the training data used to train the language model). $P(X|W)$ is the likelihood of the feature vectors X being observed given the word sequence W, as provided by the acoustic model (e.g., the probability that the feature vectors X will be extracted from audio data if the utterance in the audio data includes the word sequence W). Typically, $P(X|W)$ is computed by expanding W into all possible phoneme sequences and then replacing each phoneme with a corresponding context-dependent hidden Markov model ("HMM") (e.g., an HMM that models states of a sequence of phonemes, such as a triphone). The resulting HMM state graph encodes all possible state sequences S that correspond to the feature vectors X. The graph can be traversed to compute $P(X|W)$ according to equation [A]:

$$P(X|W) = \sum_S P(X|S,W)P(S|W) \qquad [A]$$

$$= \sum_{s_1,\ldots,s_t} P(x_1,\ldots,x_T|s_1,\ldots,s_T,W)P(s_1,\ldots,s_T|W)$$

Some ASR systems approximate the first term in the summation by referencing a generalized state cluster that corresponds to the context-dependent state $s_t$. Generalized state clusters are typically generated in an offline state clustering process that reduces the large number of unique context-dependent states (e.g., hundreds of thousands) to a smaller number of representative states (e.g., thousands) that are each used in place of some subset of the unique context-dependent states. However, there are several problems with such approximations and with the state clustering process generally. For example, dependencies across observations (e.g., sequences) are not modeled explicitly, but rather are generalized due to the clustering process. Thus, the specific context of the current sequence is not used in the model; instead, a generalized approximation is used in its place. In addition, the state clustering process is not jointly optimized with the rest of the acoustic model, but rather is performed as a discrete process.

Aspects of the present disclosure relate to dynamically generating speech recognition models during the speech recognition process based on the specific context of the current sequence of audio data. The models may be generated by an artificial neural network ("NN"), such as a deep neural network. The NN can be trained to generate a probability density function ("PDF") that models an observation probability, such as P(X|S,W) from equation [A] above, without using a discrete state clustering process as an approximation of portions of the equation. In some embodiments, the trained NN can take, as input, feature vectors for a window of n frames of audio data, where n is some positive integer. Illustratively, for the feature vector at frame t, the input may include the set of feature vectors $X=(x_{t-1}, \ldots, x_{t-n})$, where t−1 corresponds to the prior frame in the current sequence, and t−n corresponds to the $n^{th}$ prior frame in the current sequence. In addition, the NN may take, as input, information regarding the state $s_t$ being considered for the current frame t. Illustratively, the input may include the identity of a particular triphone of the HMM state graph (e.g., three separate phoneme identifiers) and an index of the current state being considered within the triphone. Based upon this input, the NN may be trained to generate a PDF that approximates the distribution of feature vectors that would be observed at the current position of the sequence given the previous n feature vectors and the current state being considered. In some embodiments, the output of the NN may be the parameters of the PDF, such as the mean and covariance matrix of a Gaussian, the mixture weights of a Gaussian mixture model ("GMM"), the factor of a subspace GMM, or the like. The ASR system can then use the PDF to generate a score for the current feature vector. The process can be repeated for each state being considered for the current frame of audio data, and for each frame of audio data (or some subset thereof). Thus, each score can be generated using a model customized for the specific context of the frame being scored. Such customized models are difficult or impossible to generate using conventional techniques due to the infinite number of potential contexts in which any frame may be observed.

Additional aspects of the present disclosure relate to semi-supervised or unsupervised training of NNs that generate PDFs (or parameters thereof) for speech recognition. Some conventional NN-based speech recognition models are trained discriminatively. For those NN-based models, ground truth transcriptions and states for the feature vectors of the training data are required. In addition, the training data needs to be decoded to generate lattices and hypotheses against which scores can be generated. In contrast, ground-truth transcriptions and states for feature vectors of the training data are not required to train NNs that generate customized PDFs for particular positions in a sequence as described herein. Instead (or in addition), the NNs can be trained using transcriptions and states generated by an ASR system without being double-checked by a human. For example, unsupervised training can be conducted to optimize the parameters of the NN to maximize the likelihood of training data. Such unsupervised maximum likelihood training is difficult or impossible using conventional NN-based speech recognition models, which generate scores or classify input vectors as targets (e.g., states). Due to the use of a non-linear feature transformation, unsupervised training of conventional NN-based recognition models bias the estimate of the likelihood of the data (e.g., non-linear feature transformations introduce a Jacobian term into the likelihood function). For example, some conventional NN-based speech recognition models may have a non-linear mapping of each feature vector in the training data input to a single point in the feature space. This may erroneously give a very high likelihood. In contrast, NNs that generate customized PDFs for particular positions in a sequence do not necessarily use a non-linear transformation on the feature vector for the current frame being scored. Instead, a model is generated non-linearly by the NN, and the feature vector for the current frame is then scored against that model without any non-linear transformation of the feature vector. The score can be used to back-propagate through the network in order to provide a better PDF.

Further aspects of the present disclosure relate to using NNs to model HMM state transition probabilities. In HMM-based speech recognition, an HMM may be used to represent a given triphone as a series of states that correspond to the expected feature vector observations for the triphone. Recognition using the HMM may be based on: (1) the probability that the current frame corresponds to a particular state of the HMM, also known as the observation probability (described above); and (2) the probability that the particular state is reached from a previous state. The latter probability is referred to as a state transition probability. Some HMM-based systems model the state transition probability for a transition from a first state to a second state by simply counting the number of transitions in training data from the first state to the second state, and then dividing by the total number of transitions from the first state to all reachable states. However, NNs may be used to learn the optimum transition probabilities for HMMs and therefore improve recognition performance. In some embodiments, a set of transition probability NNs can be defined, with one NN for each possible state position. For example, in a standard 3-state left-to-right HMM, there are three state positions: 0, 1 and 2. A state transition NN can take, as input, a vector representation of a state (e.g., $s_{t-1}$) and generate, as output, a vector describing the posterior distribution of all reachable state positions. Illustratively, ASR processing of a particular utterance may be at triphone x[y]z, state position 2. The input to the state transition NN for position 2 may be a vector representation of the triphone (e.g., phonemes x, y, and z), and the output may have nodes corresponding to transition probabilities for each reachable state position (e.g., state positions 0 and 2, because the only states reachable from state position 2 are the states at positions 0 and 2).

Although the examples and embodiments described herein will focus, for the purpose of illustration, on using neural networks to process natural language input in an automatic speech recognition system (e.g., using DNNs as acoustic models), one skilled in the art will appreciate that the techniques described herein may be applied to other processes, methods, or systems. For example, the techniques may be used with other types of neural networks, with neural networks used for purposes other than automatic speech recognition or natural language understanding, etc. Various aspects of the disclosure will now be described with regard to certain examples and embodiments, which are intended to illustrate but not limit the disclosure.

Example ASR System Using a Neural Network to Generatively Model Speech

FIG. 1 depicts an illustrative ASR system 100 configured to use an NN to generate speech models during speech recognition. As shown, the ASR system 100 includes a feature extractor 120, a speech recognition decoding graph such as an HMM state graph 130, and a generative NN 140. The components shown are illustrative only, and are not intended to be limiting. In some embodiments, the ASR system 100 may have additional, fewer, or alternative components.

Figure 2:
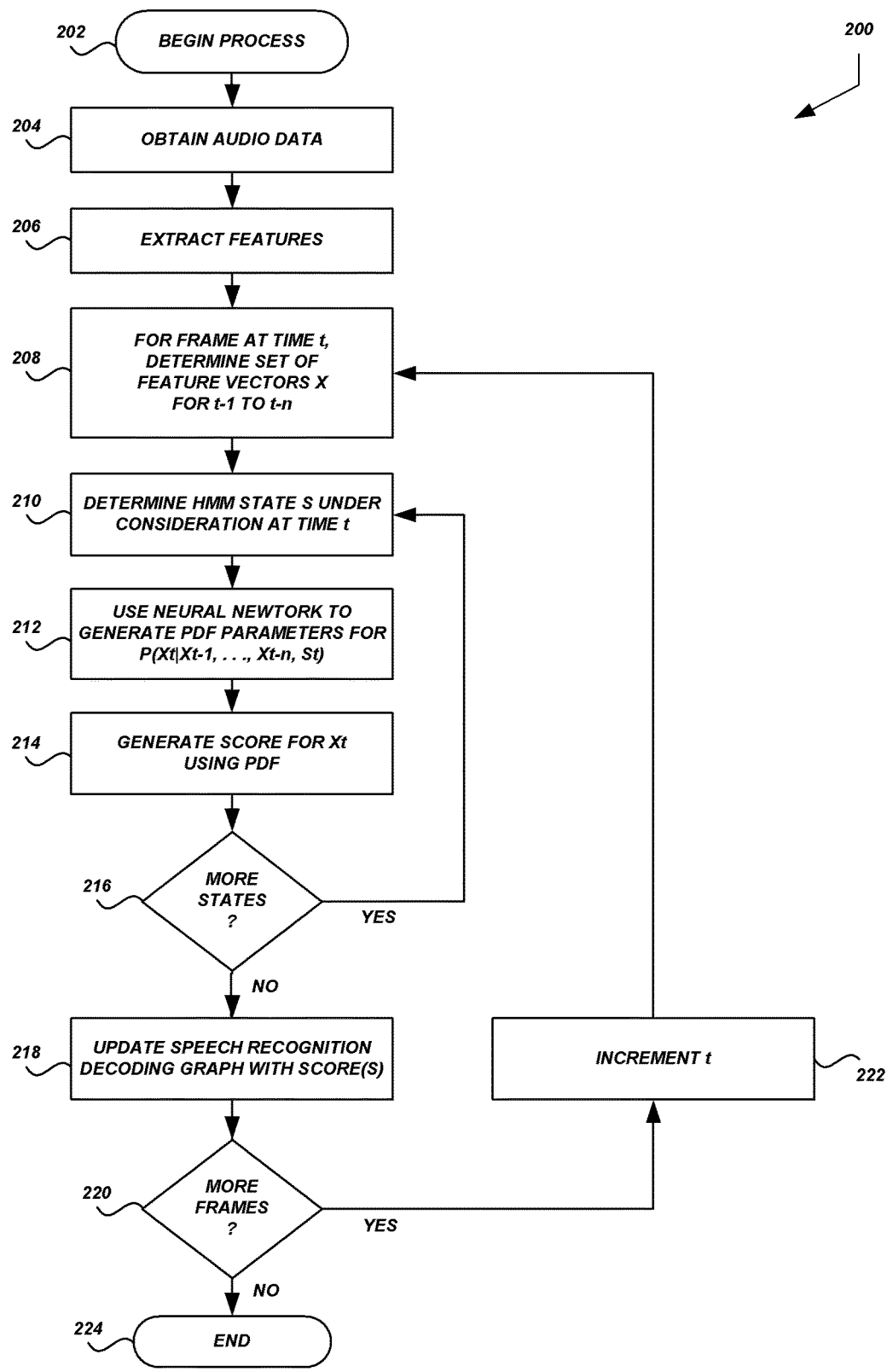
FIG. 2 is a flow diagram of an illustrative process for using neural network-based generative modeling of speech according to some embodiments.

As shown, a user 110 may make an utterance, and audio data 112 of the utterance may be obtained by the ASR system 100. The ASR system 100 may then process the audio data to generate a transcription of the utterance. In some embodiments, the ASR system 100 may use the process 200 shown in FIG. 2 to process the audio data 112. Advantageously, an ASR system 100 executing the process 200 can use a generative NN 140 to generate customized models for each position in the sequence of audio data 112 based on the specific context of the position within the sequence.

The process 200 begins at block 202. The process 200 may be embodied in a set of executable program instructions stored on a computer-readable medium, such as one or more disk drives, of a computing system of the ASR system 100. When the process 200 is initiated, the executable program instructions can be loaded into memory, such as RAM, and executed by one or more processors of the computing system.

At block 204, audio data 112 of utterance may be obtained by the ASR system 100. At block 206, the feature extractor 120 or some other module or component of the ASR system 100 can generate a sequence of feature vectors that describe the audio data 112. Illustratively, the audio data 112 may be separated into a sequence of frames, and a feature vector may be generated for each frame. The audio data 112 may be received and processed as a batch (e.g., a pre-recorded utterance), or it may be streamed to the ASR system 100 and processed by the feature extractor 120 in substantially real time (e.g., features may be extracted for the beginning of the audio data 112 before the audio data is fully received, or before the user 110 has finished speaking).

At block 208, the ASR system 100 can identify a set of feature vectors 122 to provide to the NN 140 depending upon the current position being processed in the sequence of feature vectors generated from the audio data 102. Advantageously, by providing a window of feature vectors for frames preceding the current position being processed, the NN 140 can generate a PDF based on the specific context of the current position. In addition, by limiting the contextual window to frames preceding the current position, overall system latency can be reduced in comparison with using a contextual window that includes frames following the current position in the sequence. In one example, if the audio data 112 is processed into a sequence of several hundred frames, the current frame t of the sequence to be processed may be the $100^{th}$ frame (e.g., t=100). The ASR system 100 can identify the feature vectors corresponding to the n frames in the sequence preceding the current frame at position t, where n is some predetermined or dynamically determined integer. In the present example, the ASR system 100 may use a contextual window of 10 frames, and may therefore identify frames $x_{t-1}, \ldots, x_{t-n}$ where n=10. The contextual window of 10 frames used in this example is illustrative only, and is not intended to be limiting. In some embodiments, the ASR system 100 may use a contextual window of more or less than 10 frames, depending upon the configuration of the NN 140, the computing capacity of the ASR system 100, or other configuration settings or performance factors.

At block 210, the ASR system 100 can determine the HMM state s under consideration for the current position t in the sequence (e.g., state $S_t$). The ASR system 100 may have begun generating a lattice of speech recognition results for the frames in the sequence that have been processed thus far (e.g., via previous iterations of portions of the process 200, as described below). In addition, there may be many different states under consideration for the current position t, depending upon the current path(s) active in the lattice (e.g., there may be many different active hypotheses for the utterance thus far). In the present example, if the current position in the sequence is t=100, then the lattice of results may have been generated for the previous 99 frames. In some embodiments, the lattice may be based on an HMM state graph 130 that encodes the state sequences S under consideration for the current utterance. The ASR system 100 can determine the identity of a particular triphone of the HMM state graph (e.g., three separate phoneme identifiers) and an index of the current state 132 being considered within the triphone.

At block 212, the ASR system 100 can use the NN 108 to generate parameters 142 of a PDF 150 (or the probability density function 150 itself), that can be used to score the feature vector for the current position t in the sequence. Advantageously, the NN 140 can generate the PDF parameters 142 based on the feature vectors 122 for the previous n frames in the sequence, and the current state 132 being considered, thus producing a model that is highly customized for the context of the frame to be scoring using the model. In some embodiments, the PDF parameters 142 may model a portion of equation [B] below:

$$P(X \mid W) = \sum_{s_1,\ldots,s_T} \prod_{t=1}^{T} P(x_t \mid x_{t-1}, x_{t-2}, \ldots, x_{t-n}) P(s_t \mid s_{t-1}) \quad [B]$$

In the above equation, the PDF parameters 142 generated by the NN 140 correspond to the term $P(x_t|x_{t-1}, \ldots, x_{t-n}, s_t)$. The term $P(s_t|s_{t-1})$ corresponds to the state transition probability. In some embodiments, dynamic speaker or environmental adaptation may be applied to the PDF parameters 142. For example, a previous hypothesis (e.g. from a previous utterance) can be used to adapt the PDF parameters 142 by transforming the means of the PDF parameters 142 (e.g., if the PDF 150 is a GMM) to further increase the likelihood.

At block 214, the ASR system 100 can generate a score for $x_t$, such as an acoustic score 172, for use in recognizing the current utterance. In some embodiments, the acoustic score may be based on an observation score 152 calculated using the PDF parameters 142 and the feature vector $x_t$ 124 for the current frame. The observation score 152 corresponds to the probability of observing the frame defined by $x_t$ 124 for the state $s_t$ 132, given the previous sequence of frames $x_{t-1}, \ldots, x_{t-n}$ 122. Additionally, the acoustic score 172 may be based on a transition probability 162, which corresponds to the probability that the current state $s_t$ 132 follows a previously observed state. Illustratively, the transition probability 162 may be a probability generated by some other process or it may be a static probability (e.g., 1), etc. In some embodiments, the transition probability 162 can be generated using a separate transition probability neural network, as described below with respect to FIGS. 3 and 4.

At decision block 216, the ASR system 100 can determine whether there are additional states under consideration for the current frame at position t. If so, the process 200 can return to block 210 for each state under consideration. In this way, customized models can be created on the fly (e.g., after speech recognition processing of at least some portion of a user utterance has begun) for each state under consideration for a given position in a sequence. If there are no additional states under consideration for the current position, the process 200 can proceed to block 218.

At block 218, the ASR system 100 can update the speech recognition decoding graph with scores 172 determined above at block 214. In some embodiments, one or more of the top-scoring states for the current frame (e.g., states for which PDF parameters 142 generated by the generative neural network 140 have produced the top scores 172 for the current frame above) can be added to the HMM state graph 130. Illustratively, the active states for a subsequent time t+1 will be based on the scores 172 for the current time t, thus the scores are added to the graph for use in subsequent iterations of blocks 208-216.

At decision block 220, the ASR system 100 can determine whether there are additional frames generated for the audio data 112 to be processed. If so, the process 200 can return to block 208 (after incrementing t at block 222) for each subsequent frame in the sequence. In this way, customized models can be created on the fly (e.g., after speech recognition processing of at least some portion of a user utterance has begun) for each position in a sequence.

If there are no additional frames of audio data to be processed, the process 200 can terminate at block 224. Illustratively, if there are no additional frames, then the ASR system 100 can generate a transcript or n-best list of transcripts for the audio data 112 that corresponds to the most likely word sequence W given the sequence of feature vectors X extracted from the audio data 112. The determination can be made using equation [B], above, where $P(s_t|s_{t-1})$ corresponds to the state transition probability. As described above and in greater detail below, the state transition probability may be produced using a set of state transition NNs.

In some embodiments, an ASR system may use the process 200 to generate speech models in which the observation probabilities can be conditioned on features in addition to the previous n frames and the current state under consideration. For example, the observation probabilities (and the state transition probabilities generated by state transition NNs as described below) can be conditioned on the current word under consideration or on measured features of the audio data, such as long term cepstral mean and variance statistics, statistics characterizing the channel, speaker, gender, language, etc.

Figure 3:
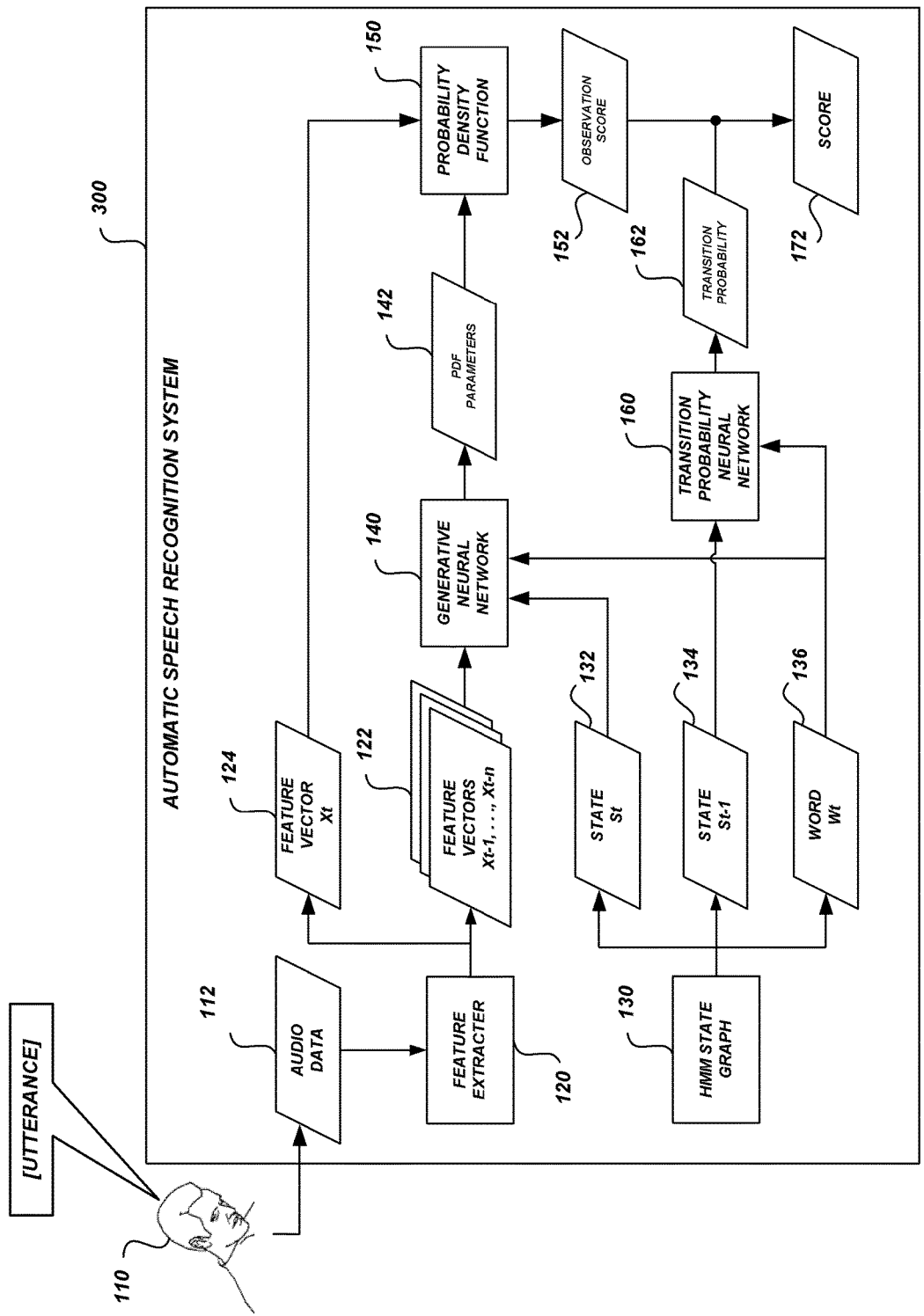
FIG. 3 is a block diagram of an illustrative speech recognition system using neural network-based generative modeling of observation probabilities and state transition probabilities according to some embodiments.

Example ASR System Using NNs for Observation Probabilities and Transition Probabilities FIG. 3 depicts an illustrative ASR system 300 that may be similar or identical in many respects to the ASR system 100 described above. The ASR system 300 can be configured to use a generative NN 140 to generate parameters 142 for a probability density function 150 during speech recognition for use in determining observation scores 152. In addition, the ASR system 300 is configured to use a transition probability NN 160 to determine state transition probabilities 162. The transition probability NN 160 can model the probabilities of transitions between states of an HMM. As shown, the transition probability NN 160 and probability density function 150 are both used to determine a score 172, such as an acoustic score, for a given frame of audio data 102.

In some embodiments, the ASR system 300 can condition the observation probabilities modeled by the PDF 150 and the state transition probabilities modeled by the transition probability NN 160 on the current word $w_t$ 136 under consideration, in addition to the current state $s_t$ 132. Equation [C] shows how observation probabilities and transition probabilities can be conditioned on the current word $w_t$ under consideration:

$$P(X \mid W) = \sum_{s_1,\ldots,s_t} \prod_{t=1}^{T} P(x_t \mid x_{t-1}, x_{t-2}, \ldots, x_{t-n}, s_t, w_t) P(s_t \mid s_{t-1}, w_t) \quad [C]$$

In the above equation, the observation score 152 generated using the PDF 150 (which is defined by the PDF parameters 142 generated by the NN 140) corresponds to the term $P(x_t|x_{t-1}, \ldots, x_{t-n}, s_t, w_t)$. The term $P(s_t|s_{t-1}, w_t)$ corresponds to the state transition probability 162 modeled by the state transition NN 160, and is based on the previous state $s_{t-1}$ 134 and, optionally, the current word $w_t$ 136.

Example Process for Training Neural Networks to Generate Speech Models

Figure 4:
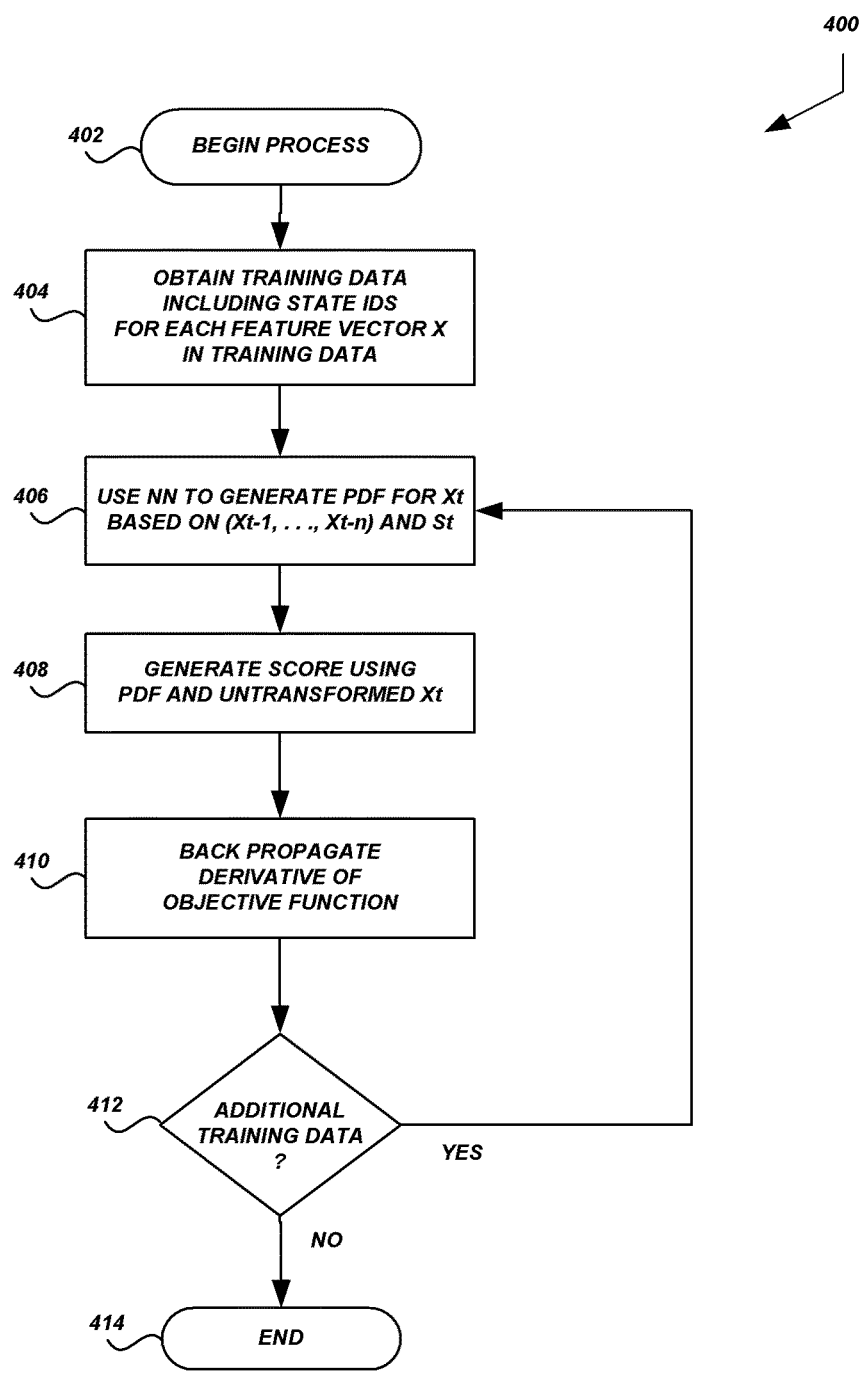
FIG. 4 is a flow diagram of an illustrative process for training a neural network for generative modeling of speech according to some embodiments.

FIG. 4 depicts an illustrative process for training generative NNs for speech modeling, such as the NNs 140 described above. Advantageously, the process 400 may be used to train the NNs in a semi-supervised or unsupervised manner, thereby conserving resources and lowering costs associated with training the NNs.

The process 400 begins at block 402. The process 400 may be embodied in a set of executable program instructions stored on a computer-readable medium, such as one or more disk drives, of a computing system, such as a computing system configured to execute the generative NN training module 530 shown in FIG. 5. When the process 400 is initiated, the executable program instructions can be loaded into memory, such as RAM, and executed by one or more processors of the computing system.

At block 404, training data can be obtained. The training data may include feature vectors, such as feature vectors extracted from previously processed audio data, feature vectors generated specifically for use in training, etc. In addition to feature vectors, the training data can include identifiers for the state that corresponds to each feature vector. Although the state identifiers may correspond to states known to be correct for the feature vectors (e.g., "ground truth" states), as provided or verified by a human, the state identifiers are not required to correspond to known correct states. Indeed, generative NNs may be trained in an unsupervised manner using state identifiers generated automatically (e.g., by the ASR system 100).

At block 406, the NN being trained (e.g., the generative NN 140) can be used to generate a PDF for a feature vector $x_t$ of audio data based on some window of previous feature vectors $x_{t-1}, \ldots, x_{t-n}$ and the state $s_t$ from the training data.

At block 408, a score can be generated using the PDF generated above and the untransformed feature vector $x_t$. By scoring an untransformed feature vector using the PDF generated from the training data, the NN 140 can then be trained using, e.g., maximum likelihood to produce better PDFs. Maximum likelihood training would not be possible if the NN was being trained to generate the score directly (as with some conventional NN-based speech models) due to the nonlinear transformation that would be applied to the feature vectors.

At block 410, parameters of the NN 140 can be updated by back propagating the derivative of the objective function being used. For example, if Q is the objective function, θ is the NN parameter vector (e.g., the weights connecting the layers), and $y_t$ is the NN output at time frame t (e.g., the PDF or parameters of the PDF generated above at block 406), the derivative of the objective function may be computed as:

$$\frac{\partial Q}{\partial \theta} = \sum_i \frac{\partial Q}{\partial y_t} \frac{\partial y_t}{\partial \theta} \quad [D]$$

In equation [D] above, the objective function Q may be any standard auxiliary function, such as the one used in maximum likelihood, maximum mutual information ("MMI"), minimum phone/word error ("MPE"), or the like. The back propagation may be performed on a frame-by-frame basis, on a batch basis after processing a batch of multiple frames, etc.

At decision block 412, a decision can made regarding whether additional training data remains to be processed. If so, the process 400 can return to block 406 for the next frame, batch, etc. Otherwise, if there is no remaining train data, the process 400 may terminate at block 416.

Spoken Language Processing System Environment

Figure 5:
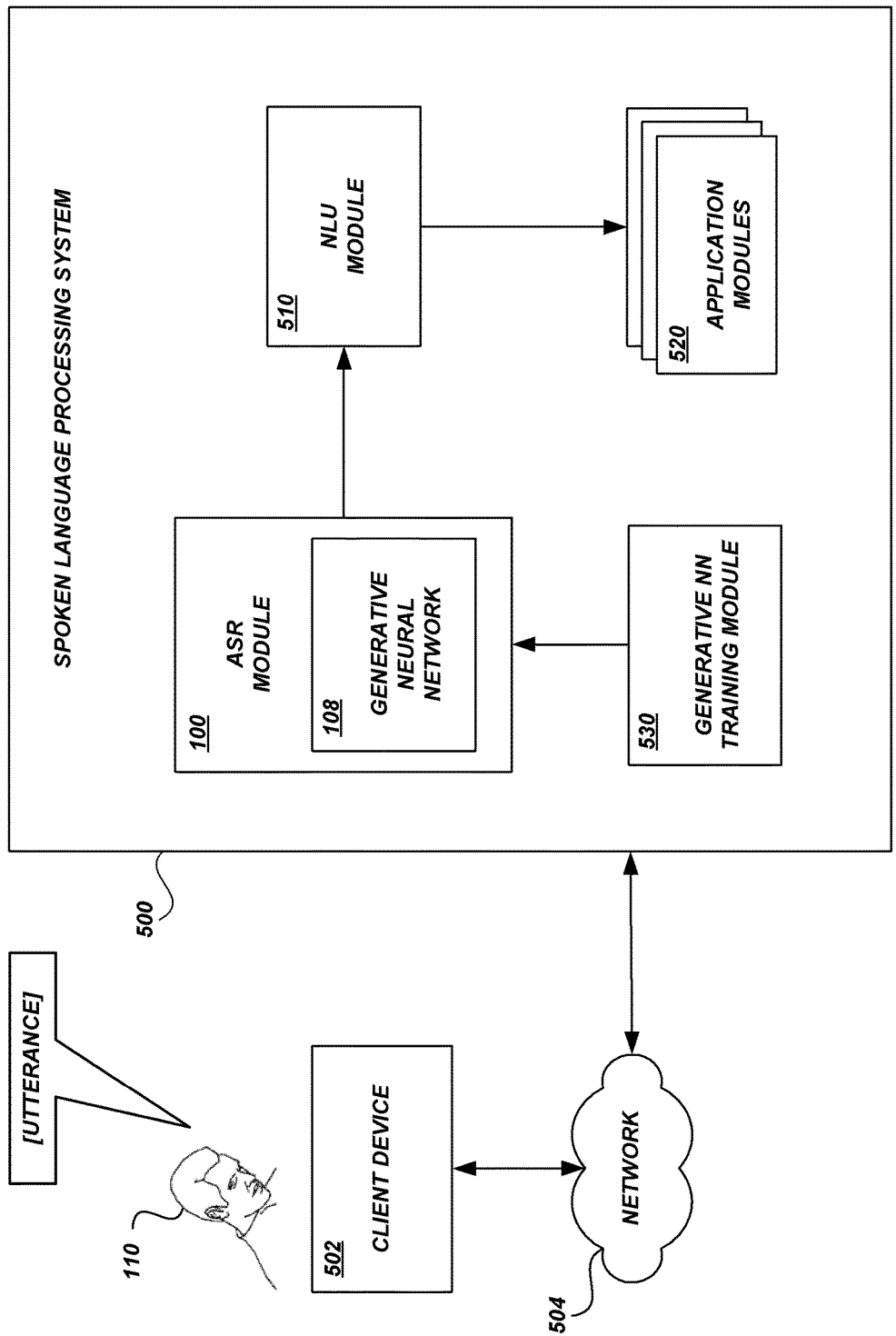
FIG. 5 is a block diagram of an illustrative network environment in which neural network-based generative modeling of speech can be implemented according to some embodiments.

FIG. 5 illustrates an example spoken language processing system 500 and a client device 502. The spoken language processing system 500 can be a network-accessible system in communication with the client device 502 via a communication network 504, such as a cellular telephone network or the Internet. A user 110 may use the client device 502 to submit utterances, receive information, and initiate various processes, either on the client device 502 or at the spoken language processing system 500. For example, the user can issue spoken commands to the client device 502 in order to get directions, listen to music, query a data source, dictate a document or message, or the like.

The client device 502 can correspond to a wide variety of electronic devices. In some embodiments, the client device 502 may be a computing device that includes one or more processors and a memory which may contain software applications executed by the processors. The client device 502 may include a microphone or other audio input component for accepting speech input on which to perform speech recognition. The software of the client device 502 may include components for establishing communications over wireless communication networks or directly with other computing devices. Illustratively, the client device 502 may be a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance.

The spoken language processing system 500 can be any computing system that is configured to communicate via a communication network. For example, the spoken language processing system 500 may include any number of server computing devices, desktop computing devices, mainframe computers, and the like. In some embodiments, the spoken language processing system 500 can include several devices physically or logically grouped together, such as an application server computing device configured to perform speech recognition on an utterance and a database server computing device configured to store records and speech recognition models.

The spoken language processing system 500 can include an ASR module or system 100, a natural language understanding ("NLU") module or system 510, one or more applications 520, and a NN training module or system 530. Illustratively, the NN training module 530 may perform the process 400 described above with respect to FIG. 4 to train the NN-based generative speech model 108. The ASR system 100 may perform process 200 and/or process 300 described above with respect to FIGS. 2 and 3 to process audio input 102 using the NN-based generative speech model 108.

In some embodiments, the spoken language processing system 500 can include various modules and components combined on a single device, multiple instances of a single module or component, etc. For example, the spoken language processing system 500 may include a separate database server that may be configured with a data store for context-specific weights, user data, etc., and a server or group of servers configured with ASR systems 100, NLU systems 510, application modules 520, and the like. In multi-device implementations, the various devices of the spoken language processing system 500 may communicate via an internal communication network, such as a corporate or university network configured as a local area network ("LAN") or a wide area network ("WAN"). In some cases, the devices of the spoken language processing system 500 may communicate over an external network, such as the Internet, or a combination of internal and external networks.

In some embodiments, the features and services provided by the spoken language processing system 500 may be implemented as web services consumable via a communication network 504. In further embodiments, the spoken language processing system 500 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 504 may be a publicly accessible network of linked networks, possibly operated by various distinct parties, such as the Internet. In other embodiments, the network 504 may include a private network, personal area network ("PAN"), LAN, WAN, cable network, satellite network, etc. or some combination thereof, each with access to and/or from the Internet. For example, the devices of the spoken language processing system 500 may be located within a single data center, and may communicate via a private network as described above. The client device 502 may communicate with spoken language processing system 500 via the Internet. The client device 502 may have access to the Internet via a wired or WiFi connection, or via a cellular telephone network (e.g., a Long Term Evolution or LTE network).

In some embodiments, the ASR system 100, either alone or in combination with other spoken language processing system modules and components, may be physically located on a client device 502. For example, a client device 502 may include an integrated ASR module or system 100 or spoken language processing system 500 such that no network access is required in order to use some or all of its features. As another example, a portion of ASR processing or other spoken language processing system 500 functionality may implemented on a client device 502, and other spoken language processing system components and features may be accessible via a communication network 504.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more physical computer processors in communication with the computer-readable memory, wherein the one or more physical computer processors are programmed by the executable instructions to at least:
      obtain audio data regarding a user utterance, the audio data comprising a sequence of frames;
      identify, for a current frame of the sequence of frames, (1) one or more speech recognition decoding graph states corresponding to the current frame, and (2) a window of frames preceding the current frame in the sequence of frames;
      generate, for a first state of the one or more speech recognition decoding graph states, a parameter of a probability density function, wherein the parameter is generated using an artificial neural network, and wherein input into the artificial neural network comprises data regarding the first state and a plurality of feature vectors corresponding to the window of frames;
      generate, for the first state of the one or more speech recognition decoding graph states, a first score using a feature vector corresponding to the current frame and the parameter of the probability density function generated using the first state; and
      select at least one state to add to the speech recognition decoding graph based at least partly on the first score and the first state.

2. The system of claim 1, wherein the probability density function models a distribution of feature vectors that correspond to a given state and a given set of preceding frames.

3. The system of claim 1, wherein the first score corresponds to a probability that the current frame is observed, given the first state.

4. The system of claim 1, wherein selecting the at least one state is further based at least partly on a transition probability generated using a second artificial neural network trained to generate state transition probabilities.

5. A computer-implemented method comprising:
   under control of one or more computing devices configured with specific computer-executable instructions,
      identifying, for a current frame of a sequence of frames of audio data, a decoding graph state corresponding to the current frame, wherein the identifying is based at least in part on one or more frames preceding the current frame in the sequence of frames;
      generating a parameter of a probability density function using an artificial neural network, wherein input into the artificial neural network comprises data regarding the decoding graph state and a feature vector for each of the one or more frames preceding the current frame;
      generating a score using the parameter of the probability density function and a feature vector corresponding to the current frame; and
      generating speech recognition results using the score.

6. The computer-implemented method of claim 5, wherein the parameter of the probability density function comprises: a mean of a Gaussian distribution; a variance of the Gaussian distribution; or a mixture weight of a Gaussian mixture model.

7. The computer-implemented method of claim 5, wherein the probability density function models a distribution of feature vectors corresponding to a given decoding graph state and a given set of preceding frames.

8. The computer-implemented method of claim 5, wherein the artificial neural network is trained using back propagation and an objective function, the objective function corresponding to one of maximum likelihood, maximum mutual information, or minimum phone error.

9. The computer-implemented method of claim 5, wherein the score corresponds to a probability that the current frame is observed given the decoding graph state.

10. The computer-implemented method of claim 9, wherein the score further corresponds to a probability that the current frame is observed given a decoding graph word.

11. The computer-implemented method of claim 5, wherein the score is further generated using an artificial neural network trained to generate state transition probabilities.

12. The computer-implemented method of claim 5, wherein the parameter of the probability density function is generated independently of any frames subsequent to the current frame in the sequence of frames.

13. The computer-implemented method of claim 5, further comprising:
   generating parameters of the probability density function for each of a plurality of decoding graph states active for the current frame, wherein the parameters of the probability density function for at least two of the plurality of decoding graph states are different; and
   generating the speech recognition results by selecting one or more top-scoring states of the plurality of decoding graph states.

14. One or more non-transitory computer readable media comprising executable code that, when executed, cause one or more computing devices to perform a process comprising:
   identifying, for a current frame of a sequence of frames of audio data, a decoding graph state corresponding to the current frame, wherein the identifying is based at least in part on one or more frames preceding the current frame in the sequence of frames;
   generating probability information using an artificial neural network, wherein input into the artificial neural network comprises data regarding the decoding graph state, and a feature vector for each of the one or more frames preceding the current frame;
   generating a score using the probability information and a feature vector corresponding to the current frame; and
   generating speech recognition results using the score.

15. The one or more non-transitory computer readable media of claim 14, wherein the probability information corresponds to one of a probability density function or parameters of a probability density function.

16. The one or more non-transitory computer readable media of claim 14, wherein the artificial neural network is trained to generate probability information associated with a probability density function that models a distribution of feature vectors corresponding to a given decoding graph state and a given set of preceding frames.

17. The one or more non-transitory computer readable media of claim 14, wherein the score corresponds to a probability that the current frame is observed given the decoding graph state.

18. The one or more non-transitory computer readable media of claim 17, wherein the score further corresponds to a probability that the current frame is observed given a decoding graph word.

19. The one or more non-transitory computer readable media of claim 14, wherein the probability information is generated independently of any frames subsequent to the current frame in the sequence of frames.

20. The one or more non-transitory computer readable media of claim 14, the process further comprising:
generating probability information for each of a plurality of decoding graph states active for the current frame, wherein the probability information for at least two of the plurality of decoding graph states is different; and
generating the speech recognition results by selecting one or more top-scoring states of the plurality of decoding graph states.

21. The system of claim 1, wherein the parameter of the probability density function comprises one of:
a mean value of a Gaussian distribution of values, wherein values of the Gaussian distribution of values correspond to an acoustic feature of audio data regarding a spoken subword unit;
a variance of the Gaussian distribution of values; or
a mixture weight of a Gaussian mixture model comprising a plurality of Gaussian distributions of values.

22. The computer-implemented method of claim 6, wherein the Gaussian distribution comprises a distribution of values corresponding to an acoustic feature of audio data regarding a spoken subword unit.

\* \* \* \* \*